Figure 1:
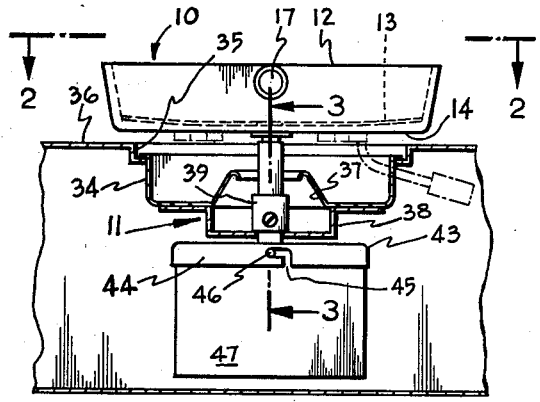

Oct. 15, 1963  S. BRYL  3,106,887

FRYING PAN

Filed March 21, 1962

INVENTOR.
Stephen Bryl
BY Ernest H. Schmidt
Attorney

United States Patent Office 3,106,887
Patented Oct. 15, 1963

3,106,887
FRYING PAN
Stephen Bryl, 67 NW. 84th St., Miami, Fla.
Filed Mar. 21, 1962, Ser. No. 181,303
9 Claims. (Cl. 99—425)

My invention relates to cooking utensils and is directed particularly to an automatic drain frying pan.

In the ordinary use of a frying pan for frying fatty meats such as bacon or sausage it is necessary to drain excess fat from time to time to insure proper cooking. Similarly, after using an ordinary frying pan for deep frying, the hot fat has to be drained into a receptacle usually kept for this purpose. In either case, the pan has to be carried from the stove burner to another position and carefully tipped to pour off the hot fat, which is a messy and, at times, dangerous operation. Moreover, it requires the use of an unsightly fat can kept handy near the stove.

It is accordingly the principal object of my invention to provide a frying pan embodying a fat drain valve and mechanism for opening and closing the valve at will while the pan is in frying position on the stove burner, and including an enclosed and hidden discharge fat canister under the stove burner for continuously or intermittently receiving fat drained from the pan.

It is a more particular object of my invention to provide an automatic drain frying pan of the above nature wherein the fat discharge canister can readily be manufactured as a part of a burner drip pan of a gas or electric stove and easily be removed along with the drip pan for emptying when necessary.

Still another object is to provide an automatic drain frying pan of the above nature wherein the drain valve in the pan engages with an extension of the fat canister which protrudes through the center of the burner drip pan and burner to allow control of the valve simply by rotating the pan by means of its handle while in frying position on the stove burner.

Yet another object is to provide a frying pan of the character described wherein the fat drain valve is so constructed as to provide a double seal when in shut-off position, to minimize any possibility of undesired fat leakage.

Another object is to provide an automatic drain frying pan which will be simple in construction, inexpensive to manufacture, readily adaptable to modern stoves whether gas or electric, and which will be dependable and long wearing in operation.

Other objects, features and advantages of the invention will be apparent from the following description when read with reference to the accompanying drawings.

Figure 5:
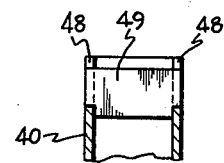
Figure 2:
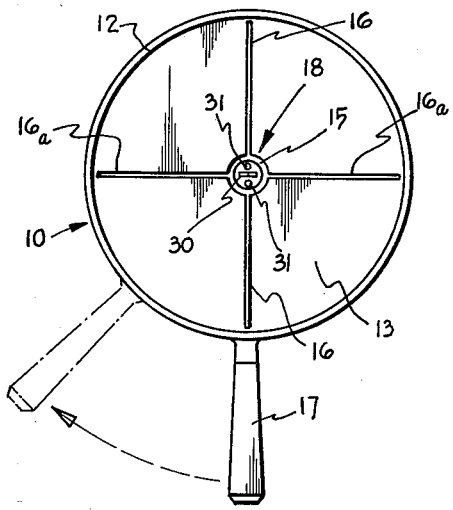
Figure 3:
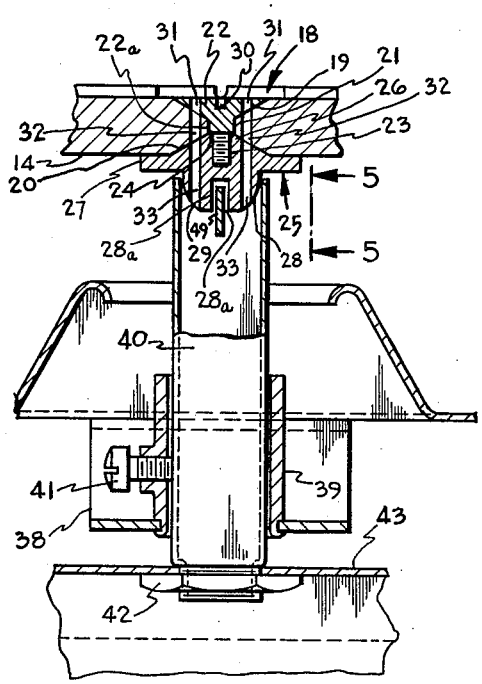
Figure 4:
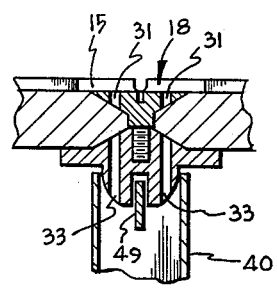
Figure 6:
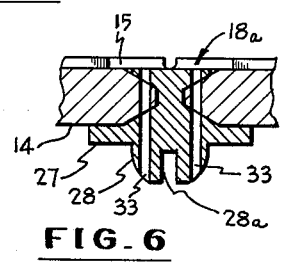

In the drawings, wherein like reference numerals denote corresponding parts throughout the several views:

FIG. 1 is an elevational view, partly in cross-section, of an automatic drain frying pan embodying the invention shown in position on a burner of an electric stove, FIG. 2 is a plan view of the frying pan shown separately, as seen along the line 2—2 of FIG. 1 in the direction of the arrows, FIG. 3 is a vertical cross-sectional view, on an enlarged scale, taken along the line 3—3 of FIG. 1 in the direction of the arrows, FIG. 4 is a cross-sectional view of the pan valve as illustrated in FIG. 3, but shown in shut-off position, FIG. 5 is a vertical cross-sectional view taken along the line 5—5 of FIG. 3 and showing constructional details of the pan valve engaging mechanism at the upper end of the canister drain pipe, and FIG. 6 illustrates in cross-section a modified construction of the drain valve.

Referring now in detail to the drawings, 10 designates, generally, a frying pan unit embodying my automatic drain frying pan invention, and 11 designates, generally, the fat drain canister and burner drip pan assembly. The frying pan unit 10 comprises a shallow pan portion 12 having a slightly concave interior bottom frying surface 13 and a flat under-surface 14. The pan portion 12 is preferably fabricated of cast metal, such as of aluminum, and is formed with a circular central recess or depression 15 and four right-angularly spaced, radial fat flow channels 16, 16, 16a, 16a, in the bottom surface 13. As illustrated in FIG. 2, the fat flow channels 16, 16, lie along a diagonal of the pan portion 12 in line with a pan handle 17, which may be of ordinary construction.

The pan portion 12 is provided with a central valve 18 through which fat in the pan flowing into the central recess 15 can drain into the canister assembly 11, as hereinbelow more fully described.

The valve 18 comprises an upper conical valve seat 19 formed centrally within the recess 15 of the pan portion 12 and a lower conical valve seat 20 coaxial with said upper conical valve seat in the undersurface 14. The valve seats 19 and 20 communicate through a central bore 21. Seated within the upper valve seat 19 is a complemental conical upper valve body member 22 having a cylindrical central shank portion 22a received within the bore 21 and a threaded stud portion 23 of decreased diameter providing an annular shoulder 24. Threadedly received on the stud portion 23 is a lower valve body member 25, said valve body member being formed with a conical portion 26, complemental with and received within the lower valve seat 20, a peripheral flange portion 27 resting in face-to-face relation against the underside 14 of the pan portion 12, and a short, cylindrical, downwardly-extending spout portion 28 the outer edge of which is rounded, as indicated at 29. It will be understood that when the upper and lower body members 22, 25 are assembled in place in the pan portion 12, the fit will be just tight enough so that they can be turned as a unit without difficulty.

As illustrated in FIG. 3, the upper surface of the upper valve body member 22 is provided with a central slot 30 and, at each side thereof, with a vertical bore 31 extending into bored openings 32 and 33 in the pan portion 12 and the lower body member 25, respectively, through which fat may drain when the valve is in open condition, as illustrated. The spout portion 28 of the valve 18 is provided with a transverse slot 28a between the bored openings 33 therein and parallel with the slot 30 in the upper valve body member 22, for the purpose hereinafter appearing.

The drain fat canister and burner drip pan assembly comprises an annular burner drip pan portion 34 of usual shape adapted to removably fit into a burner opening 35 provided in the work surface 36 (partially shown in FIG. 1) of an electric or gas range. Secured in place, as by spot welding, across the underside of the central opening 37 of the drip pan portion 34, is a U-shaped bridge member 38, centrally secured to which, in any convenient manner, is an upstanding sleeve member 39 adapted to adjustably support a drain pipe 40, the upper end of which extends coaxially up through said central opening. To this end the sleeve member 39 is tapped to receive a set screw 41 adapted to secure the drain pipe 40 in adjusted position as hereinbefore described. The lower end of the drain pipe 40 is secured, as by a nut 42, to a central opening in a fat canister cover 43. The peripheral skirt 44 of the canister cover 43 is provided with opposed bayonet slots 45 adapted to receive opposed pins 46 at the upper marginal edge portion of a round canister 47 and removably hold said canister in position below said cover (see FIG. 1).

The upper end of the drain pipe 40 is provided with opposed vertical slots 48 between which is retained, and secured in place as by spot welding, a diametrically-extending vertically disposed key 49 (see FIG. 5).

In operation, the drain fat canister and drip pan assembly 11 will be placed below a stove burner in place of the ordinary drip pan as illustrated in FIG. 1. The height of the drain pipe 40 will be adjusted by means of the set screw 41 so that, as illustrated in FIG. 3, the spout portion 28 of the valve 18 will extend partially, but not all the way, into the upper end of said drain pipe when the pan is resting centrally on the burner. It is to be noted that this can be accomplished only when the key 49 is received within the slot 28a. Since the central slot 30 at the upper end of the valve 18 extends in the same direction as the slot 28a, it is a simple matter for the cook to use said upper slot as a reference in setting the pan upon the burner so that key 49 will be received within the lower slot without difficulty. It will be noted that when the upper central slot 30 in the valve 18 is perpendicular to the flow channels 16 in line with the pan handle 17, the valve will be open to allow fat to drain down through the drain pipe 40 and into the canister 47. Moving the handle 17 through an arc of only a few degrees while the pan is in place on the burner as represented by the broken-line position of the handle in FIG. 2 for example, will cause the valve 18 to be turned in its seat and thus offset the pan openings 32 out of alignment with valve body openings 31 and 33, thereby shutting off the valve with double-seal action. It will be readily apparent that it is a simple matter to remove the canister and empty it when required.

FIG. 6 illustrates a modified form of valve 18a differing from the valve 18 of FIGS. 1 through 4 in that it is integrally formed in place in the valve seat opening, such as by a stamping operation.

While there is described herein only one form in which the invention can conveniently be embodied in practice, it is to be understood that this form is presented by way of example only and not in a limiting sense. For example, instead of the invention being in the form of a skillet or frying pan to be heated by a separate burner, it could as well be embodied in a unit electric frying pan of example only and not in a limiting sense. For ex- fat canister or receptacle. Also, instead of being reusable, the fat receiving canister could be of a disposable material such as plastic, for example, to facilitate the removal of waste fat. The invention, in short, is limited only by the scope and spirit of the following claims.

What I claim as new and desire to secure by Letters Patent is:

1. A frying pan comprising, in combination, a pan member having a substantially flat bottom wall and an upstanding peripheral wall, a handle extending outwardly of said wall, valve means in said bottom wall for draining liquid from said pan member, said valve means comprising a rotary valve member movable arcuately, selectively, between shut-off and flow positions, receptacle mechanism for receiving liquid drained from said pan member through said rotary valve when in flow position, said pan member being separable from said liquid receiving receptacle mechanism, and means connecting said liquid receiving receptacle mechanism with said rotary valve member for constraining said liquid receiving receptacle mechanism and said rotary valve member to mutually cooperative rotary motion about a common axis, whereby selective control of said valve means is effected by rotary movement of said pan member with respect to said container mechanism.

2. A frying pan as defined in claim 1 wherein said liquid receiving receptacle mechanism comprises a canister and a drain pipe extending upwardly from said canister and communicating with the interior thereof, and wherein said connecting means comprises a first horizontally-extending slot in said valve member and a transverse key in the upper end of said drain pipe seated in said slot.

3. A frying pan as defined in claim 2 wherein said liquid receiving receptacle mechanism further comprises an annular burner drip pan coaxially surrounding said drain pipe and means for securing said drip pan in adjusted position along said drain pipe.

4. A frying pan as defined in claim 1 wherein said rotary valve member is centrally located in said bottom wall and comprises an upper frusto-conical portion seated in a complementary opening in the top side of said bottom wall and a lower frusto-conical portion seated in a complementary opening in the underside of said bottom wall, and a pair of spaced openings parallel with the rotary axis of said valve member and extending, each, through said pan member and side portions of said upper and lower frusto-conical portions when said valve member is in flow position.

5. A frying pan as defined in claim 4 wherein said valve member is integrally formed.

6. A frying pan as defined in claim 4 including a second horizontal diametrically-extending slot in the upper end of said valve member serving as an index to the disposition of said first slot.

7. A frying pan as defined in claim 1 wherein the upper surface of said bottom wall is slightly concave and formed with crossed diametrically-extending drain grooves.

8. A frying pan as defined in claim 7 wherein said rotary valve member is centrally located in said bottom wall and comprises an upper frusto-conical portion seated in a complementary opening in the top side of said bottom wall and a lower frusto-conical portion seated in a complementary opening in the underside of said bottom wall, and a pair of spaced openings parallel with the rotary axis of said valve member and extending, each, through said pan member and side portions of said upper and lower frusto-conical portions when said valve member is in flow position.

9. A frying pan as defined in claim 8 wherein said liquid receiving receptacle mechanism comprises a canister and a drain pipe extending upwardly from said canister and communicating with the interior thereof, and wherein said connecting means comprises a first horizontally-extending slot in said valve member and a transverse key in the upper end of said drain pipe seated in said slot.

References Cited in the file of this patent

UNITED STATES PATENTS

| 754,310 | Horine | Mar. 8, 1904 |
| 1,769,149 | Luther | July 1, 1930 |
| 2,211,545 | Osborne | Aug. 13, 1940 |
| 2,229,518 | Parker | Jan. 21, 1941 |
| 2,945,703 | Ballard | July 19, 1960 |

FOREIGN PATENTS

| 175,623 | Switzerland | May 16, 1935 |